United States Patent
Woods et al.

(10) Patent No.: US 11,230,970 B2
(45) Date of Patent: Jan. 25, 2022

(54) EXHAUST SYSTEM WITH INTEGRATED EXHAUST PULSE CONVERTER

(71) Applicant: CUMMINS INC., Columbus, IN (US)

(72) Inventors: Alexander T. Woods, Columbus, IN (US); Nikhil Jayant Ajotikar, Columbus, IN (US); Kristopher Ray Young, Queen Creek, AZ (US)

(73) Assignee: CUMMINS INC., Columbus, IN (US)

( * ) Notice: Subject to any disclaimer, the term of this patent is extended or adjusted under 35 U.S.C. 154(b) by 0 days.

(21) Appl. No.: 16/979,737

(22) PCT Filed: Mar. 16, 2018

(86) PCT No.: PCT/US2018/022789
§ 371 (c)(1),
(2) Date: Sep. 10, 2020

(87) PCT Pub. No.: WO2019/177618
PCT Pub. Date: Sep. 19, 2019

(65) Prior Publication Data
US 2021/0040887 A1    Feb. 11, 2021

(51) Int. Cl.
*F02C 6/12* (2006.01)
*F02B 37/02* (2006.01)
*F02M 26/05* (2016.01)

(52) U.S. Cl.
CPC .............. *F02C 6/12* (2013.01); *F02B 37/025* (2013.01); *F02M 26/05* (2016.02);
(Continued)

(58) Field of Classification Search
CPC .......... F02C 6/12; F02B 37/025; F02B 37/02; F02M 26/05; F05D 2220/40;
(Continued)

(56) References Cited

U.S. PATENT DOCUMENTS 6,050,775 A    4/2000  Erdmann et al.
6,732,524 B2   5/2004  Sponton
(Continued)

FOREIGN PATENT DOCUMENTS

CN          1573119       2/2005
CN         102042076      5/2011
(Continued)

OTHER PUBLICATIONS

International Search Report and Written Opinion from PCT Application No. PCT/US2018/022789, dated Aug. 9, 2018.
(Continued)

*Primary Examiner* — Audrey B. Walter
*Assistant Examiner* — Edward Bushard
(74) *Attorney, Agent, or Firm* — Foley & Lardner LLP (57) ABSTRACT

An exhaust system includes an exhaust manifold structured to be fluidly coupled to an engine. A turbocharger including a turbine housing is fluidly coupled to the exhaust manifold. An exhaust pulse converter includes a first portion integral to the exhaust manifold and a second portion integral to the turbine housing. The exhaust pulse converter is structured to reduce engine pumping losses by reducing cross-talk of exhaust blowdown events from the engine.

20 Claims, 5 Drawing Sheets

(52) U.S. Cl.
CPC .... *F05D 2220/40* (2013.01); *F05D 2260/606* (2013.01); *F05D 2260/964* (2013.01)

(58) Field of Classification Search
CPC ......... F05D 2260/606; F05D 2260/964; F05D 2260/60; Y02T 10/12; F01D 9/026
See application file for complete search history.

(56) References Cited

U.S. PATENT DOCUMENTS

| | | | |
|---|---|---|---|
| 7,043,913 | B2 | 5/2006 | Nishiyama et al. |
| 8,206,133 | B2 | 6/2012 | Mudel |
| 8,607,625 | B2 | 12/2013 | Kowalkowski et al. |
| 8,869,607 | B2 | 10/2014 | Levijoki et al. |
| 9,051,862 | B2 | 6/2015 | Yezerets et al. |
| 9,206,732 | B2 | 12/2015 | Cattani et al. |
| 9,327,282 | B2 | 5/2016 | Yezerets et al. |
| 2004/0011036 | A1 | 1/2004 | Sponton |
| 2005/0028523 | A1* | 2/2005 | Nishiyama ............... F02B 37/02 60/605.1 |
| 2007/0089415 | A1 | 4/2007 | Shimokawa et al. |
| 2011/0088393 | A1* | 4/2011 | Romblom .............. F02M 26/41 60/605.2 |
| 2016/0146097 | A1 | 5/2016 | Ge et al. |

FOREIGN PATENT DOCUMENTS

| | | |
|---|---|---|
| CN | 102859142 | 1/2013 |
| CN | 104775881 A | 7/2015 |
| CN | 105026716 A | 11/2015 |
| JP | 2005-147011 | 6/2005 |
| WO | WO-01/09496 A1 | 2/2001 |

OTHER PUBLICATIONS

Office Action for CN Application No. 201880090979.2, dated Sep. 1, 2021.

Office Action for IN Patent Application No. 202047037982, dated Sep. 20, 2021.

* cited by examiner

EXHAUST SYSTEM WITH INTEGRATED EXHAUST PULSE CONVERTER

CROSS-REFERENCE TO RELATED PATENT APPLICATIONS

This application is the U.S. National Phase of PCT Application No. PCT/US2018/022789, filed Mar. 16, 2018, the content of which is incorporated herein by reference in its entirety.

TECHNICAL FIELD

The present disclosure relates generally to the field of internal combustion engines.

BACKGROUND

Turbochargers increase the mass air flow for a given engine displacement and given engine speed, thereby increasing power density. Exhaust gas turbochargers operate using energy extracted from hot exhaust gas produced by an engine.

A conventional exhaust gas turbocharger includes a compressor and a turbine connected to each other by a common shaft. The compressor is fluidly coupled to an intake manifold of the engine, and the turbine is fluidly coupled to an exhaust manifold of the engine. The turbine converts some of the energy contained in the hot exhaust gas into mechanical work to drive the compressor. The compressor compresses intake air before it enters the intake manifold. This improves the engine's volumetric efficiency by increasing the density of the charge air, thereby enabling more power to be produced per engine cycle.

A variable geometry turbocharger ("VGT") is a type of turbocharger designed to allow an effective aspect ratio of the turbine to be altered as conditions change. VGTs maintain an optimal aspect ratio at various engine speeds so as to maximize boost at low speeds and to prevent choking at high speeds.

SUMMARY

Various embodiments relate to exhaust systems. An example exhaust system includes an exhaust manifold structured to be fluidly coupled to an engine. A turbocharger including a turbine housing is fluidly coupled to the exhaust manifold. An exhaust pulse converter includes a first portion integral to the exhaust manifold and a second portion integral to the turbine housing. The exhaust pulse converter is structured to reduce engine pumping losses by reducing cross-talk of exhaust blowdown events from the engine.

Various other embodiments relate to turbocharger turbine housings. An example turbocharger turbine housing includes an inlet, a volute, and a diverging nozzle fluidly coupling the inlet and the volute.

Various other embodiments relate to a method of operating an exhaust system with an integrated exhaust pulse converter. An example method includes providing an exhaust system. The exhaust system includes an exhaust manifold and a turbocharger. The exhaust manifold includes first and second exhaust manifold portions. The first exhaust manifold portion is fluidly coupled to first outlet ports of a first set of cylinders of an engine. The second exhaust manifold portion is fluidly coupled to second outlet ports of a second set of cylinders of the engine. A mixing portion fluidly couples the first and second exhaust manifold portions. The mixing portion defines a nozzle. The mixing portion is structured to alternatingly receive a first exhaust gas stream from the first outlet ports in response to a first exhaust blow-down event in the first set of cylinders, and a second exhaust gas stream from the second outlet ports in response to a second exhaust blow-down event in the second set of cylinders. The turbocharger is fluidly coupled to the mixing portion of the exhaust manifold. The turbocharger includes a turbine having a turbine housing. The turbine housing defines a diffuser. In response to the first exhaust blow-down event, the nozzle of the mixing device accelerates flow of the first exhaust gas stream and reduces a pressure of the first exhaust gas stream so as to minimize cross-talk from the second exhaust gas stream. The first and second exhaust gas streams are received by the turbine. The diffuser of the turbine decelerates flow of the first and second exhaust gas streams so as to minimize wall friction flow losses of the first and second exhaust gas streams.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Pulse turbocharging systems utilize exhaust pulse energy from individual exhaust blow-down events from a multi-cylinder engine. Pulse turbocharging produces higher torque at lower engine speeds than other forms of turbocharging (e.g., constant pressure turbocharging). However, turbine efficiency is lower in pulse turbocharging systems than in constant pressure turbocharging systems because the exhaust gas flow into the turbine is highly unsteady, causing variable operating conditions for the turbine. Pulse turbocharging systems typically include a pulse converter to reduce engine pumping losses by reducing or removing interference or "cross-talk" of exhaust blow-down events. Exhaust from cylinders whose blow-down sequences do not interfere with each other are joined together in a manifold, and the manifolds from the different cylinder banks are joined together via one or more pulse converters. The pulse converter features a nozzle to accelerate the flow and drop the static pressure at the location at which the separate manifolds are joined. This in turn allows the pressure in the other connected manifold(s) to remain lower, thus offering less resistance to the next exhaust blow-down event. With less interference from other cylinders, more of the exhaust pulse energy is available to be delivered to the turbocharger, expanding the benefits of the system. The momentum generated by the acceleration also reduces backflow into the other exhaust manifold leg. Pulse converters may include a diffuser to decelerate the flow after the location at which the separate manifolds are joined to reduce wall friction flow losses as the flow continues its path through the exhaust system.

Some pulse turbocharging systems, such as those including a VGT, implement a pulse converter as a serial addition between the exhaust manifold and the turbine inlet. Other pulse turbocharging systems integrate a pulse converter into the exhaust manifold. Both systems have design challenges in that the pulse converter adds length and complexity to the exhaust system.

Various embodiments described herein relate to exhaust systems that include a pulse converter that is integrated at least in part into the turbine housing. For example, some embodiments relate to an exhaust system including an exhaust pulse converter that includes a first portion integral to the exhaust manifold and a second portion integral to the turbine housing. The exhaust pulse converter is structured to reduce engine pumping losses by reducing cross-talk of exhaust blowdown events from the engine.

According to various embodiments, the integrated pulse converter provides several technical advantages over existing pulse converters and pulse turbocharging systems. First, integrating the pulse converter at least in part into the turbine housing improves packaging of the overall pulse turbocharging system. In particular, such systems are capable of similar performance as existing systems while using much less packaging space.

Second, integrating the pulse converter at least in part into the turbine housing reduces thermal losses compared to existing systems. For example, integrating the pulse converter can result in reduced thermal mass compared to a system with a separate pulse converter.

Third, integrating the pulse converter at least in part into the turbine housing results in improved performance compared to existing systems. Integrated pulse converter systems allow the pulse converter and the turbine to be closely coupled, which enables parameters of each of the components to be tuned together as a single system. Additionally, integrating the pulse converter can decrease the number and/or severity of expansions and contractions in the system, thereby minimizing flow losses incurred in the diffuser portion of a traditional pulse converter and the subsequent flow acceleration in the turbocharger volute.

Figure 1:
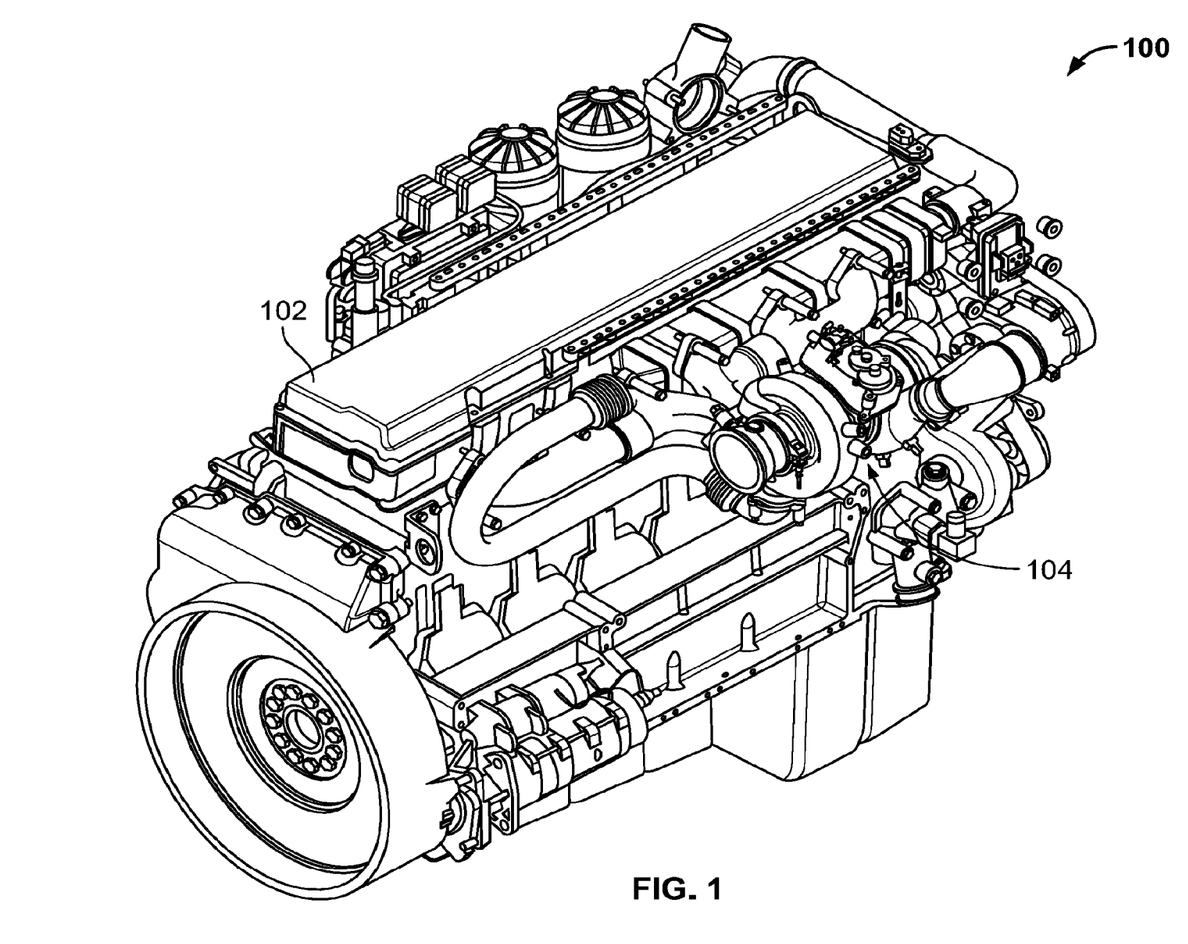
FIG. 1 is a perspective view of an engine system, according to an example embodiment.

FIG. 1 is a perspective view of an engine system 100, according to an example embodiment. The engine system 100 includes an engine 102 and an exhaust system 104 operatively coupled to the engine 102. In FIG. 1, the engine 102 is lightened to emphasize the exhaust system 104. The exhaust system 104 is described in further detail below.

Figure 2:
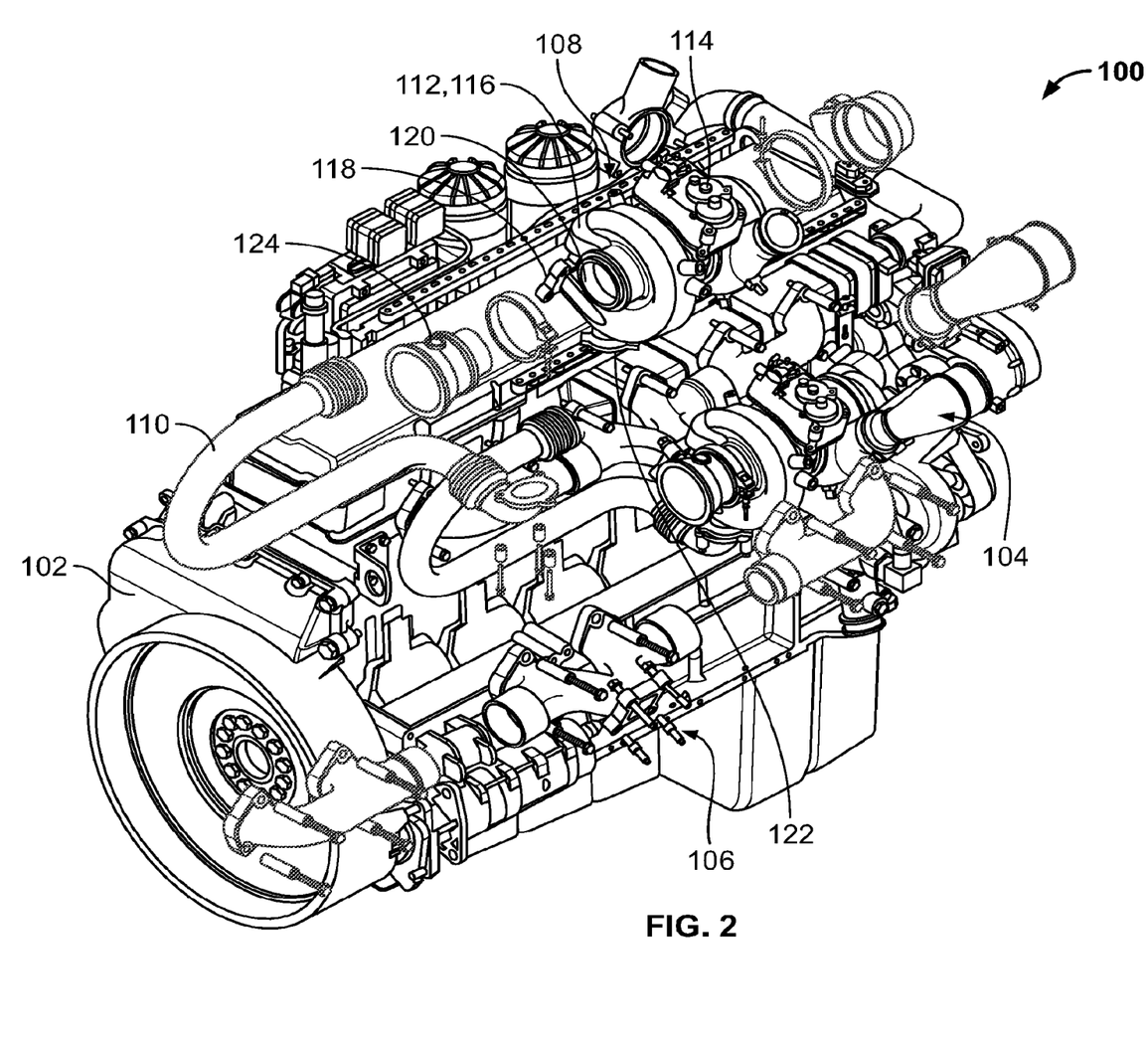
FIG. 2 is another perspective view of the engine system of FIG. 1, with an exhaust system shown in an exploded view.

FIG. 2 is another perspective view of the engine system 100 of FIG. 1, with the exhaust system 104 shown in an exploded view. The exhaust system 104 includes an exhaust manifold 106, a turbocharger 108, and a hot exhaust gas recirculation ("EGR") transfer assembly 110.

The exhaust manifold 106 is structured to be fluidly coupled to (in exhaust gas receiving communication with) outlet ports of the engine 102. The exhaust manifold 106 is structured to transmit exhaust gas from the engine 102 to the turbocharger 108.

The turbocharger 108 includes a turbine 112 and a compressor 114. The turbine 112 is fluidly coupled to the exhaust manifold 106. The compressor 114 is fluidly coupled to an intake manifold, which is fluidly coupled to intake ports of the engine 102. In some embodiments, the turbocharger 108 is a VGT. In operation, the turbine 112 converts some of the energy contained in the hot exhaust gas into mechanical work to drive the compressor 114. The compressor 114 compresses intake air before it enters the intake manifold. This improves the engine's 102 volumetric efficiency by increasing the density of the charge air, thereby enabling more power to be produced per engine cycle.

The turbine 112 includes a turbine housing 116 defining an inlet 118, an outlet 120, and an EGR take-off outlet 122. The inlet 118 is structured to be fluidly coupled to the exhaust manifold 106. The outlet 120 is structured to be fluidly coupled to an exhaust pipe (not shown). More specifically, the outlet 120 is structured to be fluidly coupled to an outlet diffuser 124, which has an increasing cross-sectional diameter so as to reduce the speed of the exhaust gas transferring therethrough and into the exhaust pipe. The EGR take-off outlet 122 is structured to be fluidly coupled to the hot EGR transfer assembly 110. In some embodiments, the turbine 112 is a single-entry turbine, meaning that the inlet 118 is the only inlet defined by the turbine housing 116, i.e., the turbine housing 116 does not define a second inlet in addition to the inlet 118.

The hot EGR transfer assembly 110 is fluidly coupled to the EGR take-off outlet 122 of the turbine 112. The hot EGR transfer assembly 110 is structured to receive exhaust gas from upstream of a turbine blade of the turbine 112 and to transmit the exhaust gas to the intake manifold of the engine 102. The hot EGR transfer assembly 110 is part of a high-pressure EGR system because it receives the exhaust gas from upstream of the turbine blade of the turbine 112.

Figure 3:
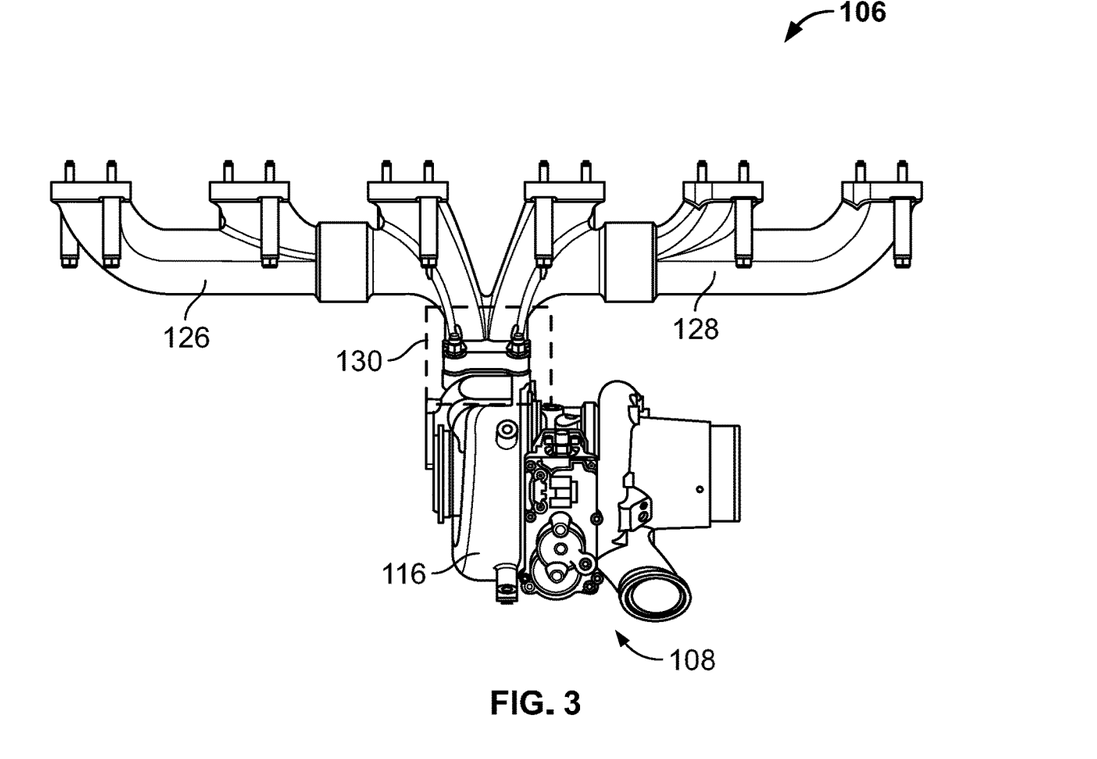
FIG. 3 is a top elevational view of the exhaust manifold and a turbocharger of the exhaust system of the engine system of FIGS. 1 and 2.

FIG. 3 is a top elevational view of the exhaust manifold 106 and the turbocharger 108 of the exhaust system 104 of the engine system 100 of FIGS. 1 and 2. The exhaust manifold 106 includes a first exhaust manifold portion 126 and a second exhaust manifold portion 128. The first exhaust manifold portion 126 is structured to be fluidly coupled to first outlet ports of a first set of cylinders of the engine 102. The second exhaust manifold portion 128 is structured to be fluidly coupled to second outlet ports of a second set of cylinders of the engine 102. Therefore, the exhaust manifold 106 can be referred to as a divided exhaust manifold.

The exhaust system 104 also includes an exhaust pulse converter 130. The exhaust pulse converter 130 is integrated at least in part into the turbine housing 116. In some embodiments, the exhaust pulse converter 130 is integrated in-part into each of the turbine housing 116 and the exhaust manifold 106. In other embodiments, the exhaust pulse converter 130 is completely integrated into the turbine housing 116. In the embodiment of FIG. 3, the exhaust pulse converter 130 can be referred to as a "mixing portion,"

because it mixes exhaust gas from the first and second exhaust manifold portions 126, 128 into a common exhaust gas flow path. In other words, the mixing portion fluidly couples the first and second exhaust manifold portions 126, 128. In some embodiments, the mixing portion is closely coupled with a tongue region of the turbine housing, which is an area just before exhaust flow starts to meet vanes feeding the turbine wheel. Such embodiments forego the use of a diffuser section and hold a more intimate relationship with the turbine wheel and vane design.

Figure 4:
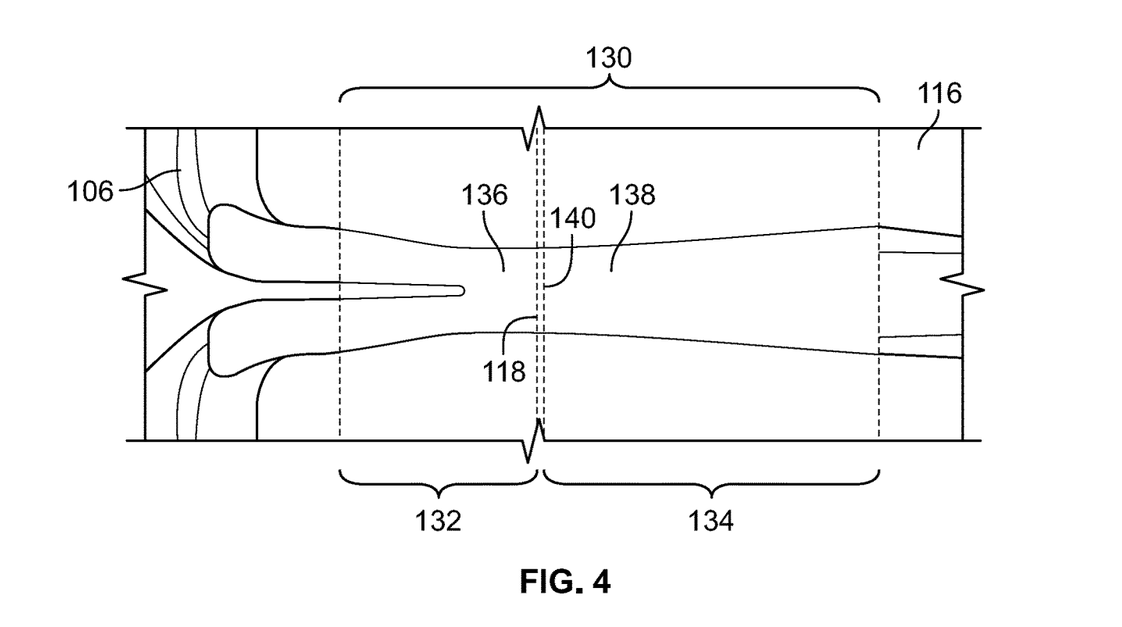
FIG. 4 is a partial cross-sectional view of the exhaust manifold and the turbocharger of FIG. 3, illustrating an integrated exhaust pulse converter.

FIG. 4 is a partial cross-sectional view of the exhaust manifold 106 and the turbine 112 of FIG. 3, illustrating the exhaust pulse converter 130. As shown in FIG. 4, the exhaust pulse converter 130 includes a first portion 132 integral to the exhaust manifold 106 and a second portion 134 integral to the turbine housing 116. The exhaust pulse converter 130 is structured to reduce engine pumping losses by reducing cross-talk of exhaust blowdown events from the engine 102.

As illustrated in FIG. 4, the first portion 132 of the exhaust pulse converter 130 has a decreasing cross-sectional diameter approaching the second portion 134. Therefore, the first portion 132 defines a nozzle 136 of the exhaust pulse converter 130. The nozzle 136 is structured to accelerate the flow rate of exhaust gas flowing therethrough and to reduce the static pressure at the portion of the nozzle 136 at which the separate portions of the exhaust manifold 106 are joined. This in turn allows the pressure in the other connected exhaust manifold(s) 106 to remain lower, thus offering less resistance to the next exhaust blow-down event. The momentum generated by the acceleration of the exhaust gas through the nozzle 136 also reduces backflow into the other connected exhaust manifold 106. The momentum is provided in the flow direction of the exhaust gas (the downstream direction), which keeps the exhaust gas moving downstream rather than flowing back into the exhaust manifold 106 (e.g., into the same or opposite leg of the exhaust manifold 106).

The second portion 134 of the exhaust pulse converter 130 has an increasing cross-sectional diameter from the inlet 118 of the turbine housing 116 and extending into the turbine housing 116. Therefore, the second portion 134 defines a diffuser 138 of the exhaust pulse converter 130. The diffuser 138 is a diverging nozzle, and the terms "diffuser" and "diverging nozzle" are used interchangeably herein. The part at which the first portion 132 meets the second portion 134 has the smallest cross-sectional diameter of the exhaust pulse converter 130 (taking into account both the first and second exhaust manifold portions 126, 128) and therefore defines a throat 140 of the exhaust pulse converter 130.

As noted above, the turbine housing 116 is a single-entry turbine housing. In an alternative embodiment, the turbine housing 116 is a twin-entry turbine housing. In such embodiments, some or all of the nozzle 136 is integrated into the turbine housing 116.

Figure 5:
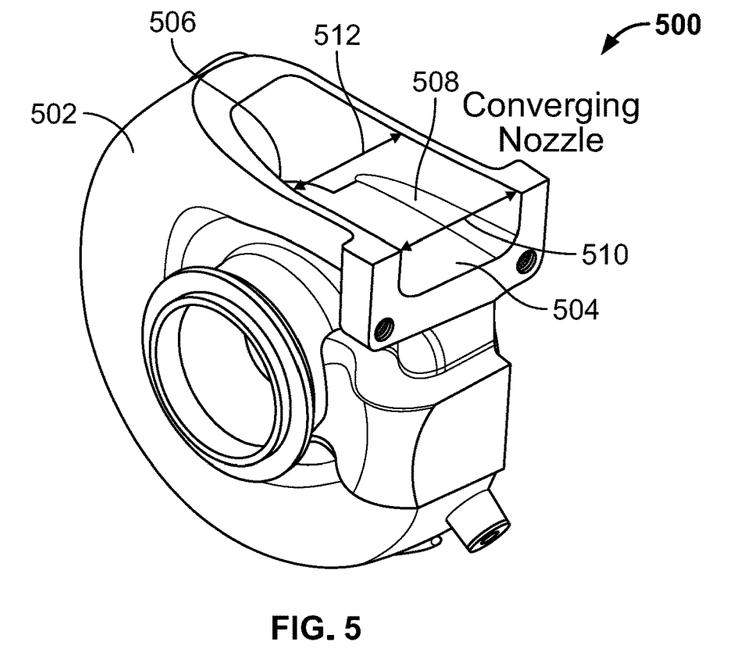
FIG. 5 is a partial cross-sectional perspective view of a conventional single-entry turbine.

FIG. 5 is a partial cross-sectional perspective view of a conventional single-entry turbine 500. The conventional single-entry turbine 500 has a turbine housing 502 defining an inlet 504, a volute 506, and a converging nozzle 508 extending between the inlet 504 and the volute 506. The converging nozzle 508 has a first cross-sectional diameter 510 proximate the inlet 504 and a second cross-sectional diameter 512 proximate the volute 506. The first cross-sectional diameter 510 is larger than the second cross-sectional diameter 512.

Figure 6:
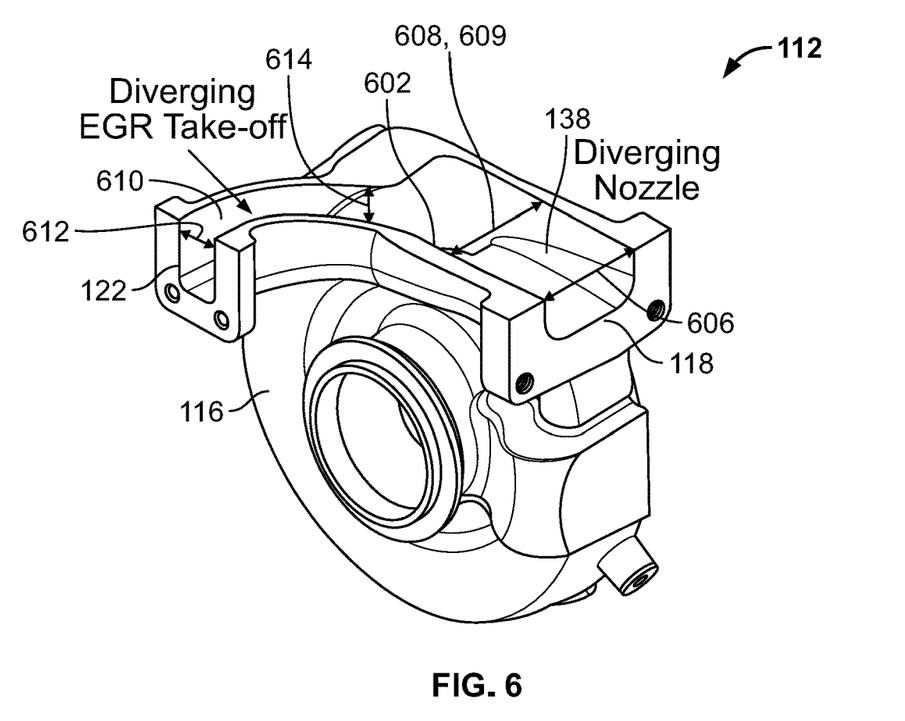
FIG. 6 is a partial cross-sectional perspective view of a turbine of the turbocharger of FIGS. 3 and 4.

FIG. 6 is a partial cross-sectional perspective view of the turbine 112 of the turbocharger 108 of FIGS. 3 and 4. The turbine housing 116 of the turbine 112 defining the inlet 118 and the EGR take-off outlet 122. The turbine housing 116 also defines a volute 602, and a diffuser 138 extending between the inlet 118 and the volute 602. In operation, exhaust gas flows from the inlet 118 to the volute 602. Therefore, the inlet 118 can be described as being "upstream" of the volute 602. The diffuser 138 has a first cross-sectional diameter 606 proximate the inlet 118 and a second cross-sectional diameter 608 at a housing "critical area" 609 upstream of the volute 602. The first cross-sectional diameter 606 is smaller than the second cross-sectional diameter 608. As mentioned above, the turbine 112 is a single-entry turbine. Accordingly, the turbine housing 116 defines only one flow path for receiving exhaust gas.

The turbine housing 116 also defines a diverging EGR take-off 610 fluidly coupled to the diffuser 138 and extending to the EGR take-off outlet 122. The diverging EGR take-off 610 is structured to divert at least a portion of the exhaust gas flowing through the diffuser 138 into the hot EGR transfer assembly 110 from upstream of the volute 602. In other words, the diverging EGR take-off is positioned downstream of the exhaust pulse converter 130. The diverging EGR take-off 610 has a third cross-sectional diameter 612 proximate the EGR take-off outlet 122 and a fourth cross-sectional diameter 614 upstream of the EGR take-off outlet 122. The third cross-sectional diameter 612 is larger than the fourth cross-sectional diameter 614. In other embodiments, the diverging EGR take-off 610 is integrated in into the exhaust manifold 106 upstream of the diffuser 138

Figure 7:
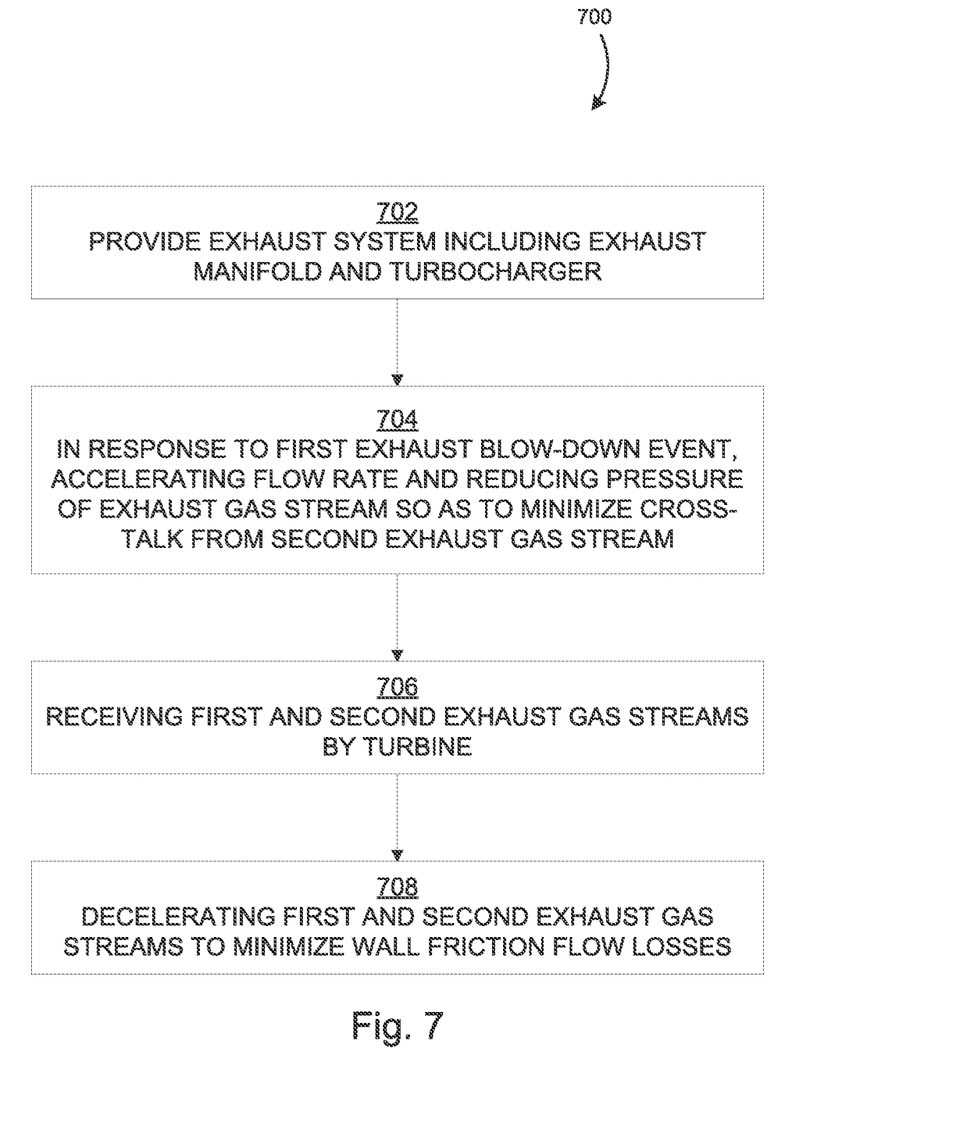
FIG. 7 is a flow chart illustrating a method of operating an exhaust system including an integrated pulse converter, according to an example embodiment.

FIG. 7 is a flow chart illustrating a method of operating an exhaust system including an integrated pulse converter, according to an embodiment. At 702, an exhaust system is provided. The exhaust system includes an exhaust manifold and a turbocharger. The exhaust manifold includes first and second exhaust manifold portions. The first exhaust manifold portion is fluidly coupled to first outlet ports of a first set of cylinders of an engine. The second exhaust manifold portion is fluidly coupled to second outlet ports of a second set of cylinders of the engine. A mixing portion fluidly couples the first and second exhaust manifold portions. The mixing portion defines a nozzle. The mixing portion is structured to alternatingly receive a first exhaust gas stream from the first outlet ports in response to a first exhaust blow-down event in the first set of cylinders, and a second exhaust gas stream from the second outlet ports in response to a second exhaust blow-down event in the second set of cylinders. The turbocharger is fluidly coupled to the mixing portion of the exhaust manifold. The turbocharger includes a turbine having a turbine housing. The turbine housing defines a diffuser.

At 704, in response to the first exhaust blow-down event, the nozzle of the mixing device accelerates flow of the first exhaust gas stream and reduces a pressure of the first exhaust gas stream so as to minimize cross-talk from the second exhaust gas stream. At 706, the first and second exhaust gas streams are received by the turbine. At 708, the diffuser of the turbine decelerates flow of the first and second exhaust gas streams so as to minimize wall friction flow losses of the first and second exhaust gas streams, thereby improving turbine efficiency. The diffuser may also improve turbine efficiency by providing a more constant pressure to the turbine wheel and by conditioning the flow prior to meeting the wheel.

In some embodiments, the nozzle comprises a first portion of an exhaust pulse converter integral to the exhaust manifold. In some embodiments, the diffuser comprises a second portion of the exhaust pulse converter integral to the turbine housing.

In some embodiments, the diffuser is a diverging nozzle that has a first cross-sectional area proximate an inlet of the turbocharger housing and a second cross-sectional area downstream of the inlet. The second cross-sectional area is larger than the first cross-sectional area. In some embodiments, the turbocharger is a single-entry variable velocity turbocharger.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams. Further, reference throughout this specification to "an example embodiment" or similar language means that a particular feature, structure, or characteristic described in connection with the embodiment is included in at least one embodiment of the present invention. Thus, appearances of the phrase "in an example embodiment" and similar language throughout this specification may, but do not necessarily, all refer to the same embodiment.

Additionally, the format and symbols employed are provided to explain the logical steps of the schematic diagrams and are understood not to limit the scope of the methods illustrated by the diagrams. Additionally, the order in which a particular method occurs may or may not strictly adhere to the order of the corresponding steps shown.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An exhaust system, comprising:
   an exhaust manifold structured to be fluidly coupled to an engine (62);
   a turbocharger comprising a turbine housing fluidly coupled to the exhaust manifold; and
   an exhaust pulse converter comprising a first portion integral to the exhaust manifold and a second portion integral to the turbine housing, the exhaust pulse converter structured to reduce engine pumping losses by reducing cross-talk of exhaust blowdown events from the engine and;
   wherein the first portion of the exhaust pulse converter comprises a nozzle of the exhaust pulse converter.

2. The exhaust system of claim 1,
   wherein the second portion of the exhaust pulse converter comprises a diffuser shows of the exhaust pulse converter.

3. The exhaust system of claim 1, wherein the exhaust manifold is a divided exhaust manifold.

4. The exhaust system of claim 1, wherein the turbine housing comprises an inlet, a volute, and a diverging nozzle extending therebetween.

5. The exhaust system of claim 4, wherein the second portion of the exhaust pulse converter is a diffuser comprising the diverging nozzle of the turbine housing.

6. The exhaust system of claim 4, wherein the diverging nozzle has a first cross-sectional area proximate the inlet and a second cross-sectional area downstream of the inlet, the second cross-sectional area being larger than the first cross-sectional area.

7. The exhaust system of claim 4, wherein the inlet of the turbine housing defines only one flow path for receiving exhaust gas such that the turbine housing is a single entry turbine housing.

8. The exhaust system of claim 4, wherein the exhaust manifold comprises:
   a first exhaust manifold portion structured to be fluidly coupled to first outlet ports of a first set of cylinders of the engine;
   a second exhaust manifold portion structured to be fluidly coupled to second outlet ports of a second set of cylinders of the engine; and
   a mixing portion comprising:
      a first inlet fluidly coupled to the first exhaust manifold portion,
      a second inlet fluidly coupled to the second exhaust manifold portion, and
      an outlet structured to be fluidly coupled to the inlet of the turbine housing, the outlet structured to mix exhaust gas from the first and second exhaust manifold portions into a common exhaust gas flow path.

9. The exhaust system of claim 4, wherein the turbine housing further comprises:
   an exhaust gas recirculation outlet; and
   a diverging exhaust gas recirculation take-off fluidly coupled to the diverging nozzle and to the exhaust gas recirculation outlet.

10. The exhaust system of claim 9, wherein the diverging exhaust gas recirculation take-off comprises a third cross-sectional area proximate the exhaust gas recirculation outlet and a fourth cross-sectional area upstream of the outlet, the third cross-sectional area being larger than the fourth cross-sectional area.

11. A turbocharger turbine housing, comprising:
   an inlet;
   a volute;
   a diverging nozzle fluidly coupling the inlet and the volute;
   an exhaust gas recirculation outlet; and
   a diverging exhaust gas recirculation take-off fluidly coupled to the diverging nozzle and to the exhaust gas recirculation outlet.

12. The turbocharger turbine housing of claim 11, wherein the diverging nozzle has a first cross-sectional area proximate the inlet and a second cross-sectional area downstream of the inlet, the second cross-sectional area being larger than the first cross-sectional area.

13. The turbocharger turbine housing of claim 11, wherein the inlet defines only one flow path for receiving exhaust gas such that the turbocharger turbine housing is a single entry turbocharger turbine housing.

14. The turbocharger turbine housing of claim 11, wherein the diverging nozzle defines a diffuser of an exhaust pulse converter.

15. The turbocharger turbine housing of claim 11, wherein the inlet is structured to be fluidly coupled to an exhaust manifold, the exhaust manifold defining a nozzle of an exhaust pulse converter proximate the inlet.

16. The turbocharger turbine housing of claim 15, wherein the exhaust manifold is a divided exhaust manifold.

17. A method, comprising:
providing an exhaust system, comprising:
an exhaust manifold, comprising:
a first exhaust manifold portion fluidly coupled to first outlet ports of a first set of cylinders of an engine,
a second exhaust manifold portion fluidly coupled to second outlet ports of a second set of cylinders of the engine, and
a mixing portion fluidly coupling the first and second exhaust manifold portions, the mixing portion defining a nozzle, the mixing portion structured to alternatingly receive:
a first exhaust gas stream from the first outlet ports in response to a first exhaust blow-down event in the first set of cylinders, and
a second exhaust gas stream from the second outlet ports in response to a second exhaust blow-down event in the second set of cylinders; and
a turbocharger fluidly coupled to the mixing portion of the exhaust manifold, the turbocharger comprising a turbine having a turbine housing, the turbine housing defining a diffuser;
in response to the first exhaust blow-down event, accelerating, by the nozzle of the mixing device, flow of the first exhaust gas stream along a flow direction of the first exhaust gas stream so as to increase momentum of the first exhaust gas stream and prevent backflow, and reducing, by the nozzle, a pressure of the first exhaust gas stream so as to minimize cross-talk from the first exhaust blow-down event to the second exhaust blow-down event;
receiving, by the turbine, the first and second exhaust gas streams; and
decelerating, by the diffuser of the turbine, flow of the first and second exhaust gas streams so as to minimize wall friction flow losses of the first and second exhaust gas streams.

18. The method of claim 17,
wherein the nozzle comprises a first portion of an exhaust pulse converter integral to the exhaust manifold, and
wherein the diffuser comprises a second portion of the exhaust pulse converter integral to the turbine housing.

19. The method of claim 17, wherein the diffuser is a diverging nozzle having a first cross-sectional area proximate an inlet of the turbine housing and a second cross-sectional area downstream of the inlet, the second cross-sectional area being larger than the first cross-sectional area.

20. The method of claim 17, further comprising, in response to the second exhaust blow-down event, accelerating, by the nozzle of the mixing device, flow of the second exhaust gas stream along a flow direction of the second exhaust gas stream so as to increase momentum of the second exhaust gas stream and prevent backflow, and reducing, by the nozzle, a second pressure of the second exhaust gas stream so as to minimize cross-talk from the second exhaust blow-down event to the first exhaust blow-down event.

* * * * *